United States Patent
Baluja

(10) Patent No.: US 11,080,809 B2
(45) Date of Patent: Aug. 3, 2021

(54) HIDING INFORMATION AND IMAGES VIA DEEP LEARNING

(71) Applicant: Google LLC, Mountain View, CA (US)

(72) Inventor: Shumeet Baluja, Leesburg, VA (US)

(73) Assignee: Google LLC, Mountain View, CA (US)

( * ) Notice: Subject to any disclaimer, the term of this patent is extended or adjusted under 35 U.S.C. 154(b) by 38 days.

(21) Appl. No.: 16/614,983

(22) PCT Filed: Feb. 13, 2018

(86) PCT No.: PCT/US2018/017911
§ 371 (c)(1),
(2) Date: Nov. 19, 2019

(87) PCT Pub. No.: WO2018/212811
PCT Pub. Date: Nov. 22, 2018

(65) Prior Publication Data
US 2020/0184592 A1    Jun. 11, 2020

Related U.S. Application Data

(60) Provisional application No. 62/508,786, filed on May 19, 2017.

(51) Int. Cl.
*G06T 1/00* (2006.01)
*G06N 3/04* (2006.01)
*G06N 3/08* (2006.01)

(52) U.S. Cl.
CPC .......... *G06T 1/005* (2013.01); *G06N 3/0454* (2013.01); *G06N 3/084* (2013.01); *G06T 2201/0065* (2013.01)

(58) Field of Classification Search
CPC ............. G06T 1/005; G06T 2201/0065; G06T 2207/20081; G06T 1/0021; G06N 3/0454; G06N 3/084; H04N 1/32144; H04N 21/835
See application file for complete search history.

(56) References Cited

PUBLICATIONS

Bell et al, "The "Independent Components" of Natural Scenes are Edge Filters", Vision Research, vol. 37, No. 23, 1997, 12 pages.
Boehm, "StegExpose—A Tool for Detecting LSB Steganography", arXiv:1410v1, Oct. 24, 2014, 11 pages.
(Continued)

*Primary Examiner* — Christopher Wait
(74) *Attorney, Agent, or Firm* — Dority & Manning, P.A.

(57) ABSTRACT

The present disclosure provides systems and methods for hiding information using deep neural networks. In one example, a computer-implemented method is provided to train neural networks for hiding images, which includes inputting a package image and a cover image into an image hiding neural network and generating a carrier image as an output, the carrier image comprising the package image hidden within the cover image. The method includes inputting the carrier image into an image decoding neural network and generating a reconstruction of the package image as an output. The method includes simultaneously training the image decoding neural network based at least in part on a first loss function that describes a difference between the package image and the reconstruction of the package image and the image hiding neural network based at least in part on the first loss function and on a second loss function that describes a difference between the cover image and the carrier image.

28 Claims, 7 Drawing Sheets

(56) References Cited

PUBLICATIONS

Brandao et al, "Artificial Neural Networks Applied to Image Steganography", IEEE Latin America Transactions, vol. 14, Issue 3, Mar. 26, 2016, pp. 1361-1366.
Cardoso, "Blind Signal Separation: Statistical Principles", Proceedings of the Institute of Electrical and Electronics Engineers, vol. 9, No. 10, 1998, 16 pages.
Das et al, "Steganography and Steganalysis: Different Approaches", 11 pages.
Fridrich et al, "Breaking HUGO—The Process Discovery", Computer Science, May 2011, 17 pages.
Fridrich et al, "Detecting LSB Steganography in Color, and Gray-Scale Images", Multimedia and Security, pp. 22-28.
Fridrich et al, "Practical Steganalysis of Digital Images: State of Art", International Society for Optical Engineering, Jun. 2002, 13 pages.
GitHub, StegExpose, retrieved on Feb. 10, 2020, https://github.com/b3dk7/StegExpose, 4 pages.
Goodfellow et al, "Generative Adversarial Nets", Conference on Neural Information Processing Systems, Dec. 8-13, 2014, Montreal, Canada, 9 pages.
Hayes et al, "ste-GAN-ography: Generating Steganographic Images via Adversarial Training", arXiv:1703v2, Mar. 2, 2017, 10 pages.
Hinton et al, "Reducing the Dimensionality of Data with Neural Networks", Science, vol. 313, Jul. 28, 2006, pp. 504-507.
Husien et al, "Artificial Neural Network for Steganography", Neural Computing and Applications, 2015, vol. 26, pp. 111-116.
Hyvärinen et al, "Independent Component Analysis: Algorithms and Applications", vol. 13, 31 pages.
Jarusek et al, "Neural Network Approach to Image Steganography Techniques", International Conference on Soft Computing—Mendel 2015, pp. 317-327.
Kavitha et al, "Neural Based Steganography", Proceedings of the 8$^{th}$ Pacific Rim International Conference on Trends in Artificial Intelligence, Auckland, New Zealand, Aug. 9-13, 2004, pp. 429-435.
Kessler, "An Overview of Steganography for the Computer Forensics Examiner", Steganography for the Computer Forensic Examiner, Apr. 1, 2016, 29 pages.
Khan et al, "Neural Network Based Steganography Algorithm for Still Images", International Journal of Computer Technology and Electronics Engineering, vol. 1, No. 2, Jan. 2018, pp. 63-67.
Kingma et al, "Adam: A Method for Stochastic Optimization", arXiv:1412v9, Jan. 30, 2017, 15 pages.
Ozer et al, "Steganalysis of Audio Based on Audio Quality Metrics", International Society for Optical Engineering, Jun. 2003, 11 pages.
Parikka, "Hidden in Plain Sight: The Steganographic Image", Unthinking Photography, Feb. 2017, https://unthinking.photography/articles/hidden-in-plain-sight-the-steganographic-image.
Pevny et al, "Using High-Dimensional Image Models to Perform Highly Undetectable Steganography", Information Hiding, 2010, pp. 161-177.
Pibre et al, "Deep Learning for Steganalysis is Better Than a Rich Model with an Ensemble Classifier, and is Natively Robust to the Cover Source-Mismatch", arXiv:1511v1, Nov. 16, 2015, 10 pages.
Pibre et al, "Deep Learning is a Good Steganalysis Tool When Embedding Key is Reused for Different Images, Even if There is a Cover Source Mismatch", arXiv1511v2, Jan. 12, 2018, 12 pages.
Qian et al, "Deep Learning for Steganalysis via Convolutional Neural Networks", International Society for Optics and Photonics, 2015, San Francisco, California, 10 pages.
Russakovsky et al, "Imagenet Large Scale Visual Recognition Challenge",arXiv:1409v3, Jan. 30, 2015, 43 pages.
Sheisi et al., "Steganography: Dct Coefficient Replacement Method and compare with Jsteg Algorithm", International Journal of Computer and Electrical Engineering, vol. 4, No. 4, 2012, pp. 458-462.
Shen et al., "Intrinsic Images Decomposition Using a Local and Global Sparse Representation of Reflectance", Journal of Latex Class Files, vol. 6, No. 1, 2007, 14 pages.
Tamimi et al, "Hiding an Image Inside Another Image Using Variable-Rate Steganography", International Journal of Advanced Computer Science and Applications, Nov. 2013, 4 pages.
Vincent et al, "Stacked Denoising Autoencoders: Learning Useful Representations in a Deep Network with a Local Denoising Criterion", Journal of Machine Learning Research, vol. 11, Dec. 2010, pp. 3371-3408.
Wang et al, "Image Quality Assessment: from Error Visibility to Structural Similarity", Image Processing, vol. 13, No. 4, May 2004, 14 pages.
Watson, "DCT Quantization Matrices Visually Optimized for Individual Images", International Society for Optical Engineering, Sep. 1993, 15 pages.
Yaghmaee et al, "Estimating Watermarking Capacity in Gray Scale Images Based on Image Complexity", Journal on Advances in Signal Processing, Jan. 2010, 10 pages.
International Search Report and Written Opinion for PCT/US2018/017911, dated Apr. 20, 2018, 15 pages.
Rehman et al, "End-to-End Trained CNN Encoders-Decoders Networks for Image Steganography", arXiv:1711v1, Nov. 20, 2017, 6 pages.

HIDING INFORMATION AND IMAGES VIA DEEP LEARNING

PRIORITY CLAIM

This application is based upon and claims the right of priority under 35 U.S.C. § 371 to International Application No. PCT/US2018/017911 filed on Feb. 13, 2018, which claims the benefit of U.S. Provisional Application Ser. No. 62/508,786 filed May 19, 2017. Applicant claims priority to and the benefit of each of such applications and incorporates all such applications herein by reference in their entirety.

FIELD

The present disclosure relates generally to machine learning and encoding information. More particularly, the present disclosure relates to using machine learning to securely hide a first payload within a second payload.

BACKGROUND

Steganography is the practice of concealing a secret message within another, ordinary message. In a common modern instantiation, steganography is used to unobtrusively hide a small message within the noisy regions of a large image.

Steganography is the art of covered or hidden writing; the term itself dates back to the 15th century, where messages were physically hidden. In modern steganography, one potential goal is to covertly communicate a digital message from A to B without party C knowing the message exists. In comparison to the better known field of cryptography, cryptography is intended to make a message unreadable by a third party but does not attempt to hide that a secret message was sent.

The steganographic process can involve placing a hidden message in a transport medium, called the carrier. The carrier is publicly visible, but typically neither the message nor its existence should be publicly visible. For added security, the hidden message can also be encrypted, thereby increasing the perceived randomness and decreasing the likelihood of content discovery even if the existence of the message detected. One common use case for steganographic methods is to hide authorship information, through digital watermarks, without compromising the integrity of the content or image.

The challenge of good steganography arises because embedding a message can alter not only the appearance but also the underlying statistics of the carrier. The amount of alteration depends on two factors: first, the amount of information that is to be hidden. A common use has been to hide textual messages in images. The amount of information that is hidden is often measured in bits-per-pixel (bpp). Often, the amount of information is set to 0.4 bpp or lower. The longer the message, the larger the bpp, the more the carrier is altered. (Fridrich et al., 2002; Hamza Ozer, Ismail Avcibas, Bulent Sankur, and Nasir D Memon. Steganalysis of audio based on audio quality metrics. In *Electronic Imaging* 2003, pages 55-66. International Society for Optics and Photonics, 2003). Second, the amount of alteration depends on the carrier image itself. Hiding information in the noisy, high-frequency, filled regions of an image yields less humanly detectable perturbations than hiding in the flat regions.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method to train neural networks for hiding image information. The method can include inputting, by one or more computing devices, a package image and a cover image into an image hiding neural network. The method can further include generating, by the one or more computing devices, a carrier image as an output of the image hiding neural network, the carrier image includes the package image hidden within the cover image. The method can further include inputting, by the one or more computing devices, the carrier image into an image decoding neural network. The method can further include generating, by the one or more computing devices, a reconstruction of the package image as an output of the image decoding neural network. The method can further include simultaneously training, by the one or more computing devices, the image decoding neural network based at least in part on a first loss function that describes a difference between the package image and the reconstruction of the package image and the image hiding neural network based at least in part on the first loss function and based at least in part on a second loss function that describes a difference between the cover image and the carrier image.

In some embodiments, the method can additionally include inputting, by the one or more computing devices, a raw package image into an image preparation neural network. The method can additionally include generating, by the one or more computing devices, a prepared package image as an output of the image preparation neural network. The method can additionally include simultaneously training, by the one or more computing devices, the image preparation neural network based at least in part on the first loss function and the second loss function, in conjunction with the image decoding neural network and the image hiding neural network, wherein the first loss function describes a difference between the reconstruction of the raw package image and the raw package image. In such embodiments, inputting, by the one or more computing devices, the package image and the cover image into the image hiding neural network includes inputting, by the one or more computing devices, the prepared package image and the cover image into the image hiding neural network, and generating, by the one or more computing devices, the reconstruction of the package image as the output of the image decoding neural network includes generating, by the one or more computing devices, the reconstruction of the raw package image as an output of the image decoding neural network.

Another example aspect of the present disclosure is directed to a computing system. The computing system includes an image hiding neural network configured to receive a package image and a cover image and, in response, output a carrier image that includes the package image hidden within the cover image; one or more processors; and a first set of instructions that, when executed by the one or more processors, cause the computing system to perform operations. Execution of the first set of instructions causes the computing system to input the package image and the cover image to the image hiding neural network. Execution of the first set of instructions further causes the computing system to generate the carrier image that includes the package image hidden within the cover image as an output of the image hiding neural network.

Another example aspect of the present disclosure is directed to a computing system. The computing system includes an image decoding neural network configured to receive a carrier image and, in response, output a reconstruction of a package image that was hidden within the carrier image; one or more processors; and a first set of instructions that, when executed by the one or more processors, cause the computing system to perform operations. Execution of the first set of instructions causes the computing system to input the carrier image to the image decoding neural network. Execution of the first set of instructions further causes the computing system to generate the reconstruction of the package image that comprises a representation of a hidden package image as an output of the image decoding neural network.

Another example aspect of the present disclosure is directed to a computing system. The computing system includes an image decoding neural network configured to receive a carrier image and, in response, output a reconstruction of a package image that was hidden within the carrier image; one or more processors; and a first set of instructions that, when executed by the one or more processors, cause the computing system to perform operations. Execution of the first set of instructions causes the computing system to input the carrier image to the image decoding neural network. Execution of the first set of instructions further causes the computing system to generate the reconstruction of the package image that includes a representation of a hidden package image as an output of the image decoding neural network.

Another example aspect of the present disclosure is directed to one or more non-transitory computer-readable media that store instructions that, when executed by one or more processors of a computing system, cause the computing system to perform operations. Execution of instructions causes the computing system to input a raw package image into an image preparation neural network. Execution of instructions further causes the computing system to generate a prepared package image as an output of the image preparation neural network. Execution of instructions further causes the computing system to input the prepared package image and a cover image into an image hiding neural network. Execution of instructions further causes the computing system to generate a carrier image as an output of the image hiding neural network, the carrier image includes the prepared package image hidden within the cover image. Execution of instructions further causes the computing system to input the carrier image into an image decoding neural network. Execution of instructions further causes the computing system to generate a reconstruction of the prepared package image as an output of the image decoding neural network. Execution of instructions further causes the computing system to simultaneously train the image decoding neural network based at least in part on a first loss function that describes a difference between the raw package image and the reconstruction of the raw package image, the image hiding neural network based at least in part on the first loss function and a second loss function that describes a difference between the cover image and the carrier image; and the image preparation neural network based at least in part on the first loss function and the second loss function.

Another example aspect of the present disclosure is directed to a computer-implemented method to train neural networks for hiding image information. The method can include inputting, by one or more computing devices, a package payload and a cover payload into an information hiding neural network. The method can further include generating, by the one or more computing devices, a carrier payload as an output of the information hiding neural network, the carrier payload comprising the package payload hidden within the cover payload. The method can further include inputting, by the one or more computing devices, the carrier payload into an information decoding neural network. The method can further include generating, by the one or more computing devices, a reconstruction of the package payload as an output of the information decoding neural network. The method can further include simultaneously training, by the one or more computing devices, the information decoding neural network based at least in part on a first loss function that describes a difference between the package payload and the reconstruction of the package payload and the information hiding neural network based at least in part on the first loss function a second loss function that describes a difference between the cover payload and the carrier payload.

Other example aspects of the present disclosure are directed to systems, apparatus, tangible, non-transitory computer-readable media, user interfaces, memory devices, and electronic devices.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
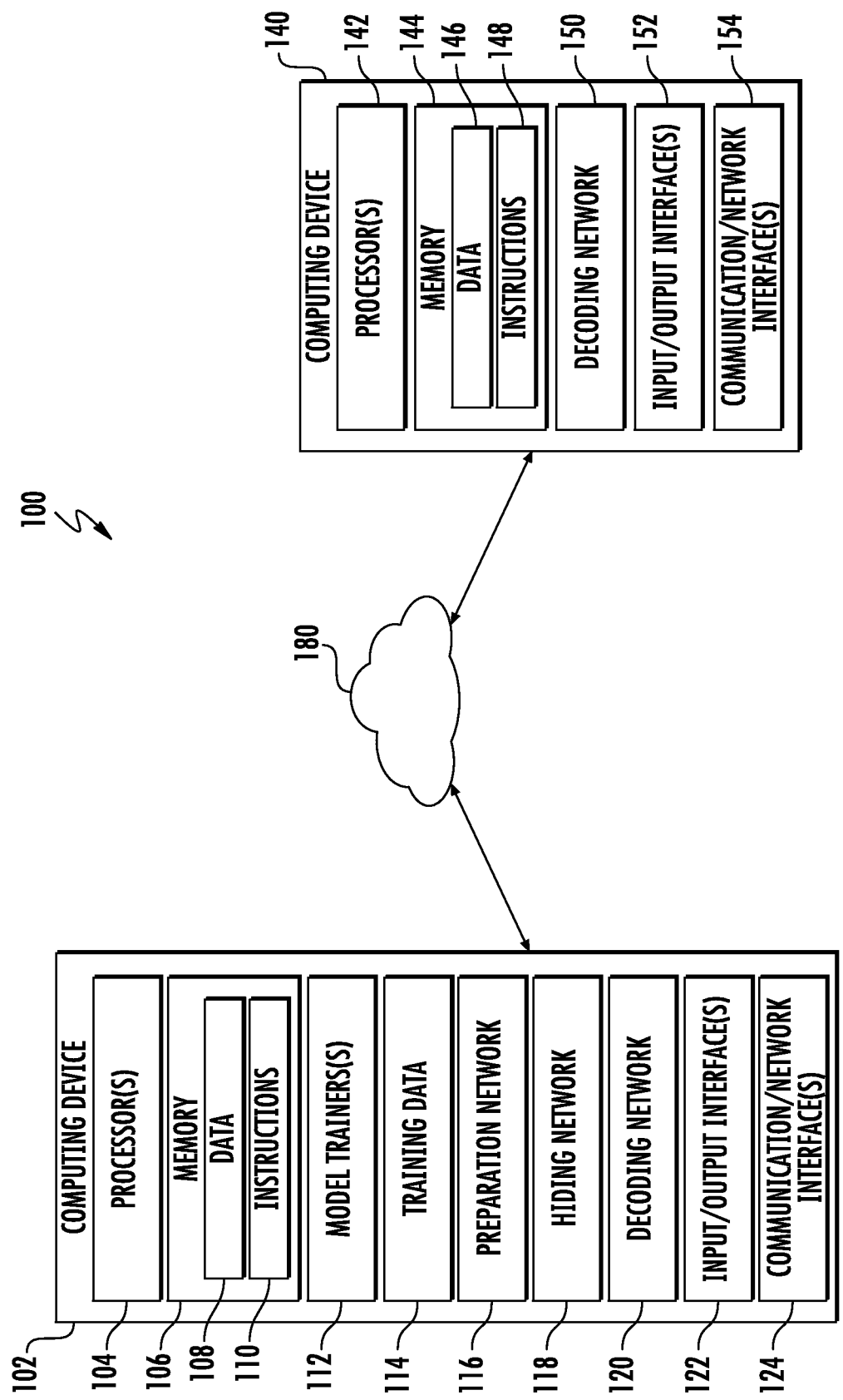
FIG. 1 depicts a block diagram of an example computing system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods for hiding information and images using deep learning. In particular, the systems and methods of the present disclosure can leverage deep neural networks to more effectively hide information, for example, hiding a package image (e.g., a secret image) within a cover image, so that it may only be recovered by an intended recipient. By using deep learning, such as deep neural networks, the systems and methods of the present disclosure can determine the best manner in which to encode information within a cover payload (e.g., cover image) to more effectively hide the information, for example, hiding a full-size image within another image of the same or similar size. In particular, by using deep neural networks, a large amount of information, such as a full-size image, can be hidden within a cover payload (e.g., cover image) in such a way that the hidden information can only be revealed by using a component of the trained deep neural network ensemble. For example, an image preparation neural network can receive as input a package image that is to be hidden, prepare the package image to be encoded within another image (e.g., a cover image) and provide the prepared package image as output. The prepared package image and a cover image can then be provided to an image hiding neural network as input and the image hiding neural network can create a carrier image as output that includes the package image encoded or otherwise hidden within the cover image. In particular, the carrier image can closely resemble the cover image. For example, it may be difficult to discern, at least visually, that the carrier image is in any way different from the cover image or that the carrier image contains additional hidden information (e.g., the package image). To recover the hidden information, the carrier image can be then provided as input to a simultaneously trained decoding neural network which provides as output a reconstruction of the package image.

Steganography is the practice of concealing a secret message within another, ordinary message. Implementations of the present disclosure provide for hiding a full size color image within another image of the same or different size. In particular, according to an aspect of the present disclosure, deep neural networks are simultaneously trained to create the hiding and revealing process and are trained to specifically work as a unit. The deep neural networks can be trained on images drawn randomly from a database of images, such as natural images from a wide variety of sources. Unlike many popular steganographic methods that encode the secret message within the least significant bits of the carrier image, systems and methods of the present disclosure can compress and distribute a secret image's representation across all of the available bits of a carrier image.

In contrast, most common steganography approaches concentrate on manipulating the least significant bits (LSB) of images to hide information—whether done uniformly or adaptively, through replacement or through more advances schemes. (Jessica Fridrich, Miroslav Goljan, and Rui Du. Detecting lsb steganography in color, and gray-scale images. *IEEE multimedia*, 8(4):22-28, 2001; Abdelfatah A Tamimi, Ayman M Abdalla, and Omaima Al-Allaf. Hiding an image inside another image using variable-rate steganography. *International Journal of Advanced Computer Science and Applications (IJACSA)*, 4(10), 2013). Though often not visually observable, statistical analysis of image and audio files can reveal whether the statistical properties of the files deviate from the expected. Even simple first-order statistics are often revealing. More complex methods of hiding information which attempt to preserve the image statistics have been attempted, including those that model first and second order statistics of potential cover images directly; one of the most popular approaches is named HUGO (Tomáš Pevny', Tomáš Filler, and Patrick Bas. Using high-dimensional image models to perform highly undetectable steganography. In *International Workshop on Information Hiding*, pages 161-177. Springer, 2010). However, this is also commonly employed with relatively small messages (<0.5 bpp). In contrast to the previous work, systems and methods of the present disclosure use a neural network to implicitly model the distribution of natural images as well as embed a much larger message, a full-size image, into a carrier image.

Despite recent impressive results achieved by incorporating deep neural networks with steganalysis (Yinlong Qian, Jing Dong, Wei Wang, and Tieniu Tan. Deep learning for steganalysis via convolutional neural networks. In *SPIE/IS&T Electronic Imaging*, pages 94090J-94090J. International Society for Optics and Photonics, 2015; Lionel Pibre, Jérôme Pasquet, Dino Ienco, and Marc Chaumont. Deep learning is a good steganalysis tool when embedding key is reused for different images, even if there is a cover source mismatch. *Electronic Imaging*, 2016(8):1-11, 2016; Lionel Pibre, Pasquet Jérôme, Dino Ienco, and Marc Chaumont. Deep learning for steganalysis is better than a rich model with an ensemble classifier, and is natively robust to the cover source-mismatch. *arXiv preprint arXiv:*1511.04855, 2015), there have been relatively few attempts to incorporate neural networks into the hiding process itself. (Sabah Husien and Haitham Badi. Artificial neural network for steganography. Neural Computing and Applications, 26(1):111-116, 2015; Imran Khan, Bhupendra Verma, Vijay K Chaudhari, and Ilyas Khan. Neural network based steganography algorithm for still images. In *Emerging Trends in Robotics and Communication Technologies (INTERACT)*, 2010 International Conference on, pages 46-51. IEEE, 2010; V Kavitha and KS Easwarakumar. Neural based steganography. PRICAI 2004: *Trends in Artificial Intelligence*, pages 429-435, 2004; Alexandre Santos Brandao and David Calhau Jorge. Artificial neural networks applied to image steganography. *IEEE Latin America Transactions*, 14(3):1361-1366, 2016; Robert Jarušek, Eva Volna, and Martin Kotyrba. Neural network approach to image steganography techniques. In *Mendel* 2015, pages 317-327. Springer, 2015). Some of these studies have used a DNN to select which LSBs to replace in an image with the binary representation of a text message. Others have used ANN to find the right bits to extract from container images that may contain messages.

In contrast to the approaches described above, in at least some implementations of the present disclosure, the hidden message (e.g., package image) is dispersed throughout the bits in the cover image, and a decoder network, that has been simultaneously trained with the encoder network, is used to find and recover the hidden image (e.g., the package image).

In the systems and methods of the present disclosure, one goal is to be able to hide a full N×N RGB pixel secret image (e.g., package image) in another N×N cover image, with minimal distortion to the cover image. If sent without errors, this would imply bpp=4 (one half of all bits). However, unlike many previous studies, in which a hidden text message must be sent with perfect reconstruction, the systems and methods of the present disclosure can, in some implementations, relax the requirement that the secret image (e.g., package image) is losslessly sent. Instead, acceptable trade-offs in the quality of the carrier image and secret image (e.g., package image) are found.

Thus, the present disclosure provides information hiding (AKA "steganography") techniques that can allow for encoding a large amount of information in an image with limited noticeable artifacts. In particular, the systems and methods of the present disclosure can perform the encoding and decoding of hidden information using component neural networks that are trained simultaneously as a deep neural network ensemble in such a way that the hidden information can only be recovered using a component of the deep neural network ensemble and where it is difficult to detect that information has been hidden.

In particular, in some implementations, systems and methods for information hiding can include an image preparation neural network, an image hiding neural network, and an image decoding neural network wherein the neural networks are trained simultaneously (e.g., in a joint fashion in which one or more gradients are passed from one network to another). For example, the three networks can be trained simultaneously as a large neural network ensemble by providing a first training signal to the image decoding neural network and providing the first training signal along with a second training signal to the image hiding neural network and the image preparation neural network.

In particular, according to an aspect of the present disclosure, the first training signal can include a first loss function that describes a first difference between the package image and the reconstruction of the package image. Thus, in such fashion, the image decoding neural network can be trained to extract and reconstruct the package image from the available input information. According to another aspect of the present disclosure, the second training signal can include a second loss function that describes a second difference between the cover image and the carrier image. In such fashion, the image hiding neural network and/or the image preparation neural network can be trained to create a carrier image that is as close as possible to the cover image, while still containing (e.g., encoding) sufficient information so as to enable the image decoding neural network to produce a quality reconstruction of the package image.

Alternatively, in some implementations, systems and methods for information hiding can include an image hiding neural network and an image decoding neural network wherein the neural networks are trained simultaneously. That is, in some implementations, the image preparation neural network is not included within the ensemble. The image hiding neural network and the image decoding neural network can be trained simultaneously as an ensemble by providing a first training signal to the image decoding neural network and providing the first training signal along with a second training signal to the image hiding neural network.

More particularly, according to one aspect of the present disclosure, in some implementations, the image preparation neural network receives as input an image that is to be hidden (the package image). The image preparation neural network can prepare the package image to be encoded within a cover image. As an example, the image preparation neural network can provide a prepared package image as output where the prepared package image is the same size as an intended cover image. For example, in some implementations, the package image can be a different size than the cover image and the image preparation neural network can intelligently resize the package image to match the size of the cover image. As one example, a package image may have a size of M×M pixels and a cover image may have a size of N×N pixels, where M<N such that the package image is smaller than the cover image. The image preparation neural network can progressively increase the size of the package image, thereby distributing the package image's bits across the entire N×N pixels. As another example, where the package image size is larger than the cover image size, the image preparation neural network can compress the package image to match the size of the cover image. In some implementations, the image preparation neural network can also determine which pixels of the package image are more important to keep in the prepared package image. In another example, in some implementations, the image preparation neural network can transform color-based pixels to features that may be more useful for encoding the image.

In some implementations, the architecture of the image preparation neural network is a deep neural network, for example, a convolutional or feed-forward neural network, with the input being RGB inputs of the size of the package image (for example, 3 channel M×M inputs) and the output being RGB outputs the size of the intended cover image (for example, 3 channel N×N outputs). In some implementations, the architecture of the image preparation neural network is specified but the computed functions are determined during the deep network training.

In some implementations, the image hiding neural network receives as input the prepared package image from the image preparation neural network and a cover image. The image hiding neural network encodes the prepared package image inside the cover image, providing as output a carrier image that closely resembles the cover image but which also contains the hidden package image. As an example, in some implementations, the image hiding neural network determines which bits of the cover image may be used to encode the package image information, so that the output carrier image closely resembles the cover image, but provides for recovery of a representation of the package image from the carrier image. In some implementations, the image hiding neural network can intelligently decide which bits of the cover image to use for encoding such that the package image information is distributed throughout the cover image and such that it is difficult to determine that any information is hidden in the output carrier image.

In some implementations, the architecture of the image hiding neural network is a deep neural network, for example, a convolutional or feed-forward neural network, with the inputs being the output of the image preparation network and the cover image (for example, a N×N pixel field with depth-6 for the RGB channels of the cover image and the 3 channels of the prepared package image) and with the output of the image hiding neural network being RGB outputs the size of the cover image (for example, 3 channel N×N outputs). In some implementations, the image hiding neural network architecture can include multiple convolution layers which can look at a variety of patch sizes, for example, 3×3, 4×4, 5×5, and/or 6×6 overlapping patches.

In some implementations, the image decoding neural network receives as input the carrier image, which is output from the image hiding network. The image decoding neural network can decode the carrier image to determine the hidden information, providing as output a reconstructed package image that is as close to the original package image as possible.

In some implementations, the architecture of the image decoding neural network is a deep neural network, for example, a convolutional or feed-forward neural network, with the inputs being the carrier image (for example, 3 channel N×N inputs) and the output being the RGB outputs of the reconstructed package image. The image decoding neural network architecture can include multiple convolution layers with a variety of patch sizes. For example, in some implementations, the image decoding neural network architecture can include three to five convolution layers with 4×4 patches. Additionally or alternatively, the image decoding neural network can include one or more convolution layers which look at 3×3, 4×4, 5×5, and/or 6×6 overlapping patches.

According to another aspect of the present disclosure, the image preparation neural network, the image hiding neural network, and the image decoding neural network are trained together simultaneously as a large, deep neural network ensemble using two error signals. Training the networks together as an ensemble ensures that information is hidden within a carrier image in such a way that the decoding network is required to recover the hidden information. That is, jointly training the networks enables the generation of a joint hiding/decoding scheme that is specific to and performable only by the jointly trained networks.

In one example, the first error function used in the training of the network ensemble can be the error from the decoding neural network, the error function being the difference (e.g., the pixel-wise difference) between the original package image and the reconstructed package image, with the goal of training being to minimize the difference between the two. As another example, the second error function used in the training of the neural networks can be the error from the image hiding neural network, the error function being the difference (e.g., the pixel-wise difference) between the cover image and the carrier image, with the goal of the training being to minimize the difference between the two. The difference image (e.g., the difference between two images) for the error functions can be computed in a variety of manners, for example, being a simple absolute value difference in pixel values, a sum-of squares difference, etc.

In particular, in some implementations, during training, the first error function is provided to all three neural networks whereas the second error function is only provided to the image preparation neural network and the image hiding neural network. For example, the image decoding neural network is provided with the first error function during training, such as by back-propagating the first error function gradient through the image decoding neural network. The image preparation neural network and the image hiding neural network are provided with both the first error function and the second error function during training, for example by back-propagating the combined gradients of the first error function and the second error function through each of the image hiding neural network and the image preparation neural network. Additionally, various other training techniques can be used in addition or alternatively to backwards propagation of error techniques. Additional example training methodologies include Adam (adaptive moment estimation), evolutionary algorithms such as genetic algorithms and simulated annealing, and/or other training techniques.

For example, because the decoding neural network does not need to know how to reconstruct the cover image from the carrier image but only how to reconstruct the package image from the carrier image, the decoding neural network does not need to be trained with the second error function associated with the difference between the cover image and the carrier image. However, all of the networks may need to know what will be needed in encoding and recovering the package image, so all of the networks may be trained with the first error function of the difference between the package image and the reconstruction of the package image.

In some implementations, noise can be added during training of the neural networks to improve the encoding of the package image within the cover image. For example, in some implementations, a defined amount of noise can be added to the output of the image hiding neural network, the carrier image, during training. Adding a small amount of noise to the carrier image ensures that the image hiding neural network does not just encode the package image into the least significant bits of the cover image, but instead the representation of the package image is distributed throughout the cover image. For example, adding noise to the carrier image during training means that the decoding neural network cannot rely on the least significant bit to recover the hidden information because it is noisy. As such, the hiding network cannot simply encode the package image in the in the least significant bits of the cover image because if it did so, the package image would not be reconstructed accurately. Therefore, adding a defined small amount of noise to the carrier image during training teaches the image hiding network to not rely on the least significant bits to encode the package image but instead spread out the encoded representation of the package image.

In some implementations, any set of package images and cover images may be used for training the neural network. For example, because there is no labeling required for the training data, any sets of images that are of the same type of images to be used as package images and cover images may be used to train the neural networks. For example, in some implementations, any set of natural images (generally the type of images that are taken with a camera) can be used to train the neural networks and the neural networks can then be used to hide a first natural image (the package image) within a second natural image (the cover image). Alternatively, if other types of images are intended to be hidden, for example, man-made images, graphs, charts, or the like, sets of those types of images can be used as training data for training the neural networks.

According to another aspect of the present disclosure, the systems and methods of the present disclosure can be used in hiding other types of information. For example, a hiding neural network and a decoding neural network can be trained to hide other types of information besides images, such as text or audio information, for example, where a first payload is hidden within a second payload. Thus, in one example, an audio hiding neural network can be used to receive a package audio dataset and a cover audio dataset and, in response, output a carrier audio dataset that includes the package audio dataset hidden within the cover audio dataset. An audio decoding neural network can extract or otherwise reconstruct the package audio dataset from the carrier audio dataset. In further implementations, the neural network schemes described herein can be used to perform steganography for mixed medium data. For example, textual information can be hidden within image information, image information can be hidden within audio information, or other combinations of different types of data. Generally, the neural network ensemble architectures and training techniques described by the present disclosure can be applied to perform steganography for any forms of data or combinations thereof.

According to another aspect of the present disclosure, once the image hiding neural network and the decoding neural network are trained, the decoding neural network can be provided to intended recipients of hidden information so that they may recover hidden information from carrier images. For example, in some implementations, once the neural networks are trained, a user planning to hide information can provide the intended recipients with the decoding neural network, such that a recipient can examine images from the user to determine if any information is hidden within the image and recover the hidden information from the image. In some embodiments, transferring the decoding neural network (e.g., the neural network architecture and weights) to a recipient can be done using a cryptography scheme to further protect the security of the hidden information by ensuring that only the recipient can access the decoding neural network.

According to another aspect of the present disclosure, systems and methods for information hiding can include an image hiding neural network and an image decoding neural network. For example, in some implementations, an image preparation neural network may not be required to prepare images before they are to be encoded by the image hiding neural network. For example, in some implementations, the package image and the cover image may be similar or same sized images and ready for encoding and thus no preparation is necessary before encoding the package image within the cover image. Thus, in such implementations, the image hiding neural network can simply receive a package image to be hidden which has not been prepared in some way.

According to another aspect of the present disclosure, in some implementations, the network error functions can be modified to limit the ability to discover information about a hidden package image by comparing an original cover image with a carrier image. For example, if the original cover image is known, it could be subtracted from the carrier image, leaving residuals which could reveal some information about the hidden package image in some cases. In particular, in some implementations, an additional error term can be added that minimizes the pixel-wise correlation between the residual of the cover image and the package image. By using the additional error term minimizing the correlation, the residual of the cover image reveals less information about the hidden package image. However, in some instances, the use of an additional error term may decrease the quality of the reconstructed package image.

With reference now to the Figures, example embodiments of the present disclosure will be discussed in further detail.

Example Devices and Systems

FIG. 1 depicts a block diagram of an example computing system 100 that performs encoding and decoding of hidden information using component networks that are trained simultaneously as a deep neural network ensemble according to example embodiments of the present disclosure. The system 100 includes a first computing device 102 and a second computing device 140 that are communicatively coupled over a network 180.

The first computing device 102 can be any type of computing device, such as, for example, a personal computing device (e.g., laptop or desktop), a mobile computing device (e.g., smartphone or tablet), a gaming console or controller, a wearable computing device, an embedded computing device, a personal assistant computing device, or any other type of computing device.

The first computing device 102 includes one or more processors 104 and a memory 106. The one or more processors 104 can be any suitable processing device (e.g., a processor core, a microprocessor, an ASIC, a FPGA, a controller, a microcontroller, etc.) and can be one processor or a plurality of processors that are operatively connected.

The memory 106 can include one or more non-transitory computer-readable storage mediums, such as RAM, ROM, EEPROM, EPROM, flash memory devices, magnetic disks, etc., and combinations thereof. The memory 106 can store data 108 and instructions 110 which are executed by the processor 104 to cause the first computing device 102 to perform operations.

According to an aspect of the present disclosure, the first computing device 102 can store or include one or more machine-learned models. The machine-learned models can be or can otherwise include one or more neural networks (e.g., deep neural networks) or the like. Neural networks (e.g., deep neural networks) can be feed-forward neural networks, convolutional neural networks, and/or various other types of neural networks.

More particularly, machine-learned models can be implemented to provide encoding and decoding of hidden information, for example within images. As one example, the machine-learned models can include a preparation network 116, a hiding network 118, and a decoding network 120. In particular, the preparation network 116 can receive a package image that is to be hidden as input, prepare the package image to be encoded within another image, and provide the prepared package image as output. The hiding network 118 can receive the prepared package image and a cover image as input and create a carrier image as output that includes the package image encoded or otherwise hidden within the cover image. The decoding network 120 can receive the carrier image as input and provide as output a reconstruction of the original (e.g., "raw") package image.

The first computing device 102 can also include model trainer(s) 112. The model trainer 112 can simultaneously train or re-train machine-learned models, such as preparation network 116, hiding network 118, and decoding network 120, stored at the first computing device 102 using various training or learning techniques, such as, for example, backwards propagation of errors (e.g., truncated backpropagation through time). In particular, the model trainer 112 can simultaneously train or re-train the machine-learned models, the preparation network 116, hiding network 118, and decoding network 120, using locally stored training data 114. In particular, the training data 114 can include, for example, sets of natural images that can be input to the preparation network 116, hiding network 118, and decoding network 120 as package images and cover images to train the preparation network 116, hiding network 118, and decoding network 120 to effectively encode and decode hidden information, such as a package image, within a cover image. The model trainer 112 can perform a number of generalization techniques (e.g., weight decays, dropouts, etc.) to improve the generalization capability of the models being trained. Thereafter, the trained preparation network 116, hiding network 118, and decoding network 120 can be used immediately to hide and recover information, for example, by hiding a package image inside a cover image and by reconstructing a package image from a carrier image.

The first computing device 102 can also include one or more input/output interface(s) 122. One or more input/output interface(s) 122 can include, for example, devices for receiving information from or providing information to a user, such as a display device, touch screen, touch pad, mouse, data entry keys, an audio output device such as one or more speakers, a microphone, haptic feedback device, etc. An input/output interface(s) 122 can be used, for example, by a user to control operation of the first computing device 102.

The first computing device 102 can also include one or more communication/network interface(s) 124 used to communicate with one or more systems or devices, including systems or devices that are remotely located from the first computing device 102. The communication/network interface(s) 124 can include any circuits, components, software, etc. for communicating with one or more networks (e.g., network 180). In some implementations, the communication/network interface(s) 124 can include, for example, one or more of a communications controller, receiver, transceiver, transmitter, port, conductors, software, and/or hardware for communicating data.

The second computing device 140 includes one or more processors 142 and a memory 144. The one or more processors 142 can be any suitable processing device (e.g., a processor core, a microprocessor, an ASIC, a FPGA, a controller, a microcontroller, etc.) and can be one processor or a plurality of processors that are operatively connected. The memory 144 can include one or more non-transitory computer-readable storage mediums, such as RAM, ROM, EEPROM, EPROM, flash memory devices, magnetic disks, etc., and combinations thereof. The memory 144 can store data 146 and instructions 148 which are executed by the processor 142 to cause the second computing device 140 to perform operations.

As described above, the second computing device 140 can store or otherwise include one or more machine-learned models. The machine-learned models can be or can otherwise include one or more neural networks (e.g., deep neural networks) and the neural networks (e.g., deep neural networks) can be feed-forward neural networks, convolutional neural networks, and/or various other types of neural networks.

More particularly, the second computing device 140 can receive and store a trained machine-learned model that is or includes a decoder network 150, for example, from the first computing device 102 via the network 180. The second computing device 140 can use the decoder network 150 to analyze images to determine whether an image contains hidden information, for example encoded within the image by the hiding network 118 of the first computing device 102, and to recover the hidden information from the image.

The second computing device 140 can also include one or more input/output interface(s) 152. The one or more input/output interface(s) 152 can include, for example, devices for receiving information from or providing information to a user, such as a display device, touch screen, touch pad, mouse, data entry keys, an audio output device such as one or more speakers, a microphone, haptic feedback device, etc. An input/output interface(s) 152 can be used, for example, by a user to control operation of the second computing device 140.

The second computing device 140 can also include one or more communication/network interface(s) 154 used to communicate with one or more systems or devices, including systems or devices that are remotely located from the second computing device 140. The communication/network interface(s) 154 can include any circuits, components, software, etc. for communicating with one or more networks (e.g., network 180). In some implementations, the communication/network interface(s) 154 can include, for example, one or more of a communications controller, receiver, transceiver, transmitter, port, conductors, software, and/or hardware for communicating data.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well.

Example Methods

FIGS. 2-5 illustrate example methods of the present disclosure. Although FIGS. 2-5 respectively depict steps in a particular order for purposes of illustration and discussion, the methods of the present disclosure are not limited to the particularly illustrated order or arrangement. The various steps of the methods of FIGS. 2-5 can be omitted, rearranged, combined, and/or adapted in various ways without deviating from the scope of the present disclosure.

Figure 2:
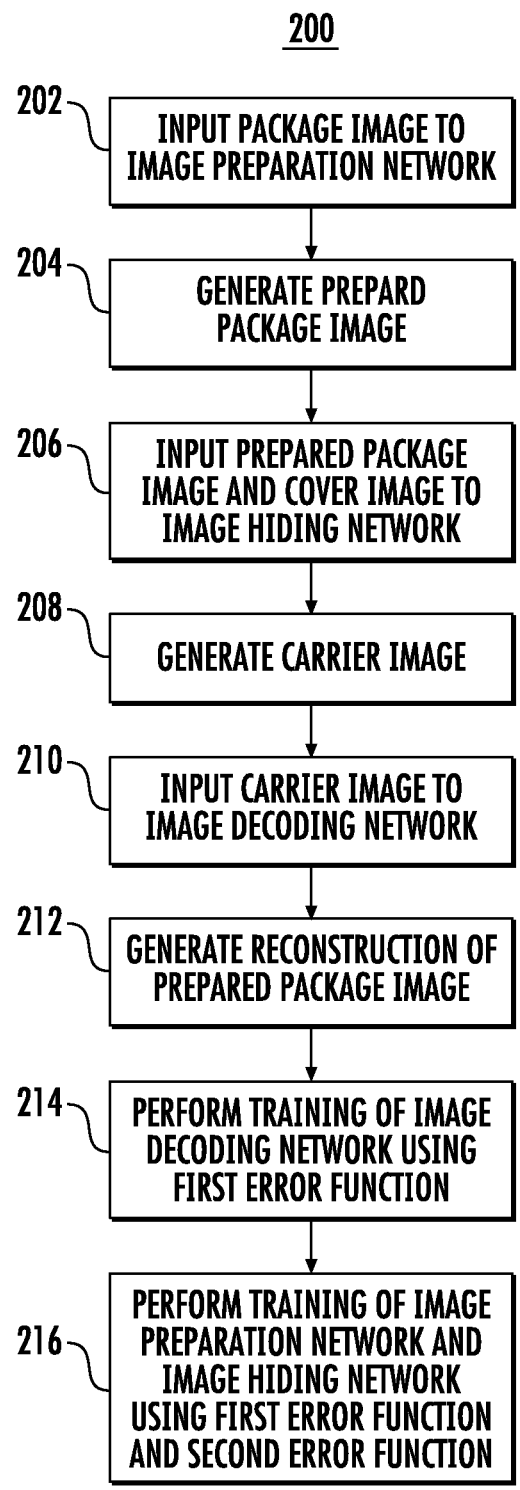
FIG. 2 depicts a flowchart diagram of an example method of training networks for hiding information according to example embodiments of the present disclosure.

FIG. 2 depicts a flowchart diagram of an example method 200 of training networks for hiding information according to example embodiments of the present disclosure.

At 202, a computing device, such as first computing device 102 of FIG. 1, obtains a package image (e.g., an image to be hidden) and inputs the package image to an image preparation neural network. As one example, in some implementations, the package image can be any type of image that is the same type of image intended to be hidden and recovered by the trained neural network ensemble, such as a natural image.

At 204, the image preparation neural network can prepare the package image to be encoded within a cover image and generate a prepared package image as output. In particular, in some implementations, the image preparation neural network can intelligently resize the package image to match the size of the cover image. For example, the image preparation neural network can receive as input a package image that is a smaller size image than the cover image and can increase the size of the package image by distributing the package image's pixels to output a prepared package image that is the same size image as the cover image.

At 206, the prepared package image and a cover image can be input to an image hiding network. At 208, the image hiding neural network encodes or otherwise hides the prepared package image inside the cover image, generating as output a carrier image that resembles the cover image but which also contains the hidden package image. For example, in some implementations, the image hiding neural network can intelligently decide which bits of the cover image to use for encoding such that the package image information is distributed throughout the cover image and such that it is difficult to determine that any information is hidden in the output carrier image.

At 210, the carrier image can be input to an image decoding neural network. At 212, the image decoding neural network can decode the carrier image to determine the hidden information and generate as output a reconstructed package image that is close to the original package image.

At 214, the image decoding neural network is then trained with a first error function that evaluates or otherwise describes the difference (e.g., the pixel-wise difference) between the original package image and the reconstructed package image, with the goal of training the being to minimize the difference between the two images. For example, the image decoding neural network can be provided with the first error function during training, such as by back-propagating the first error function gradient through the image decoding neural network.

At 216, the image hiding neural network and the image preparation neural network are then trained with both the first error function and a second error function that evaluates or otherwise describes the difference (e.g., the pixel-wise difference) between the cover image and the carrier image, with the goal of the second error function being to minimize the difference between the cover image and the carrier image. For example, the image hiding neural network and the image preparation neural network can be provided with both the first error function and the second error function during training, for example by back-propagating the combined gradients of the first error function and the second error function through each of the image hiding neural network and the image preparation neural network.

Figure 3:
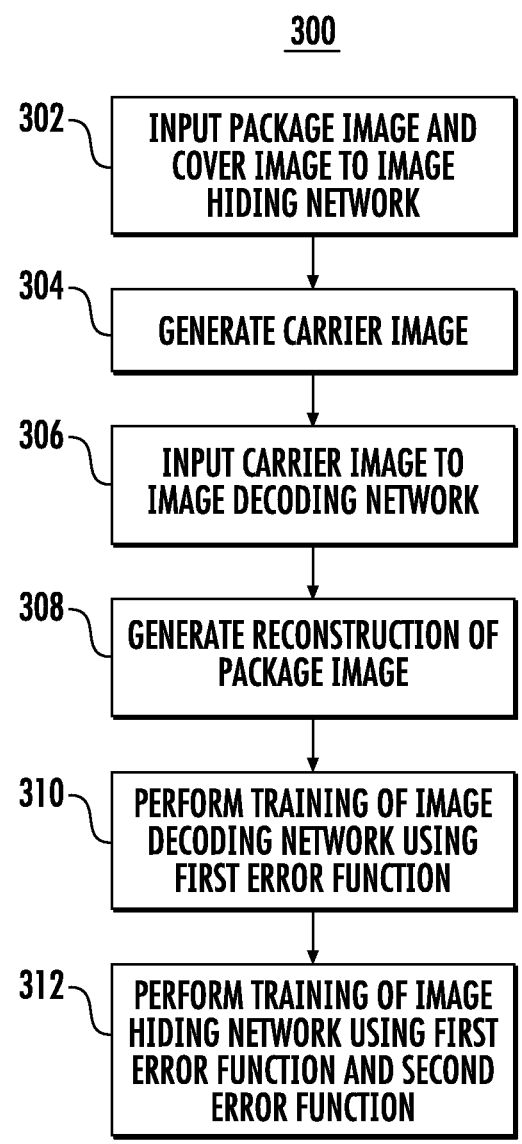
FIG. 3 depicts a flowchart diagram of another example method of training networks for hiding information according to example embodiments of the present disclosure.

FIG. 3 depicts a flowchart diagram of another example method of training networks for hiding information according to example embodiments of the present disclosure.

At 302, a computing device, such as first computing device 102 of FIG. 1, obtains a package image and a cover image and inputs the package image and the cover image to an image hiding network. As one example, in some implementations, the package image and the cover image can be any type of images that are the same type of image intended to be hidden and recovered by the trained neural network ensemble, such as a natural image.

At 304, the image hiding neural network encodes or otherwise hides the package image inside the cover image, generating as output a carrier image that resembles the cover image but which also contains the hidden package image. For example, in some implementations, the image hiding neural network can intelligently decide which bits of the cover image to use for encoding such that the package image information is distributed throughout the cover image and such that it is difficult to determine that any information is hidden in the output carrier image.

At 306, the carrier image can be input to an image decoding neural network. At 308, the image decoding neural network can decode the carrier image to determine the hidden information and generate as output a reconstructed package image that is close to the original package image.

At 310, the image decoding neural network can be trained with a first error function that evaluates or otherwise describes the difference (e.g., the pixel-wise difference) between the original package image and the reconstructed package image, with the goal of training the being to minimize the difference between the two images. For example, the image decoding neural network can be provided with the first error function during training, such as by back-propagating the first error function gradient through the image decoding neural network.

At 312, the image hiding neural network can be trained with both the first error function and a second error function that evaluates or otherwise describes the difference (e.g., the pixel-wise difference) between the cover image and the carrier image, with the goal of the second error function being to minimize the difference between the cover image and the carrier image. For example, the image hiding neural network can be provided with both the first error function and the second error function during training, for example by back-propagating the combined gradients of the first error function and the second error function through the image hiding neural network.

Figure 4:
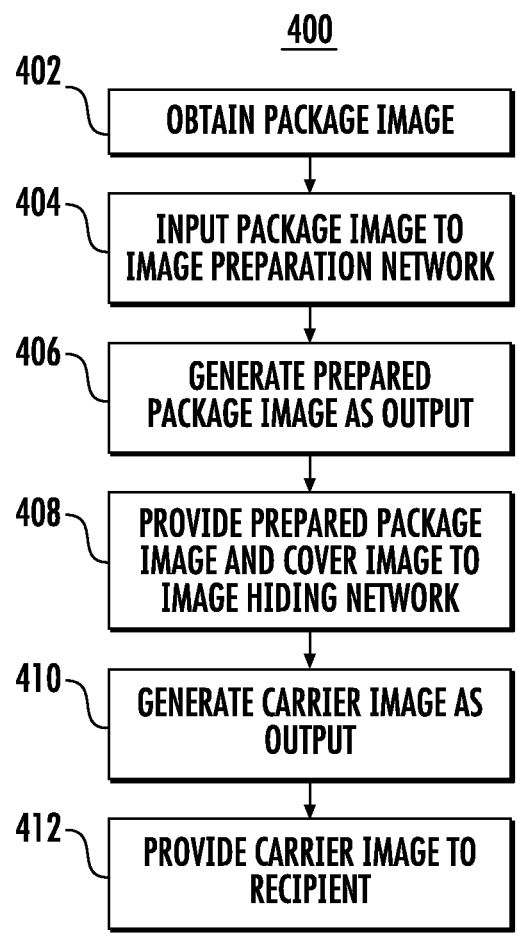
FIG. 4 depicts a flowchart diagram of an example method of hiding information according to example embodiments of the present disclosure.

FIG. 4 depicts a flowchart diagram of an example method of hiding information according to example embodiments of the present disclosure.

At 402, a computing device, such as first computing device 102 of FIG. 1, obtains a package image and, at 404, inputs the package image to an image preparation neural network.

At 406, the image preparation neural network can prepare the package image to be encoded within a cover image and can generate a prepared package image as output. In particular, in some implementations, the image preparation neural network can intelligently resize the package image to match the size of the cover image. For example, the image preparation neural network can receive as input a package image that is a smaller size image than the cover image and can increase the size of the package image by distributing the package image's pixels to output a prepared package image that is the same size image as the cover image.

At 408, the prepared package image and a cover image can be input to an image hiding network. At 410, the image hiding neural network encodes or otherwise hides the prepared package image inside the cover image, generating as output a carrier image that closely resembles the cover image but which also contains the hidden package image. For example, in some implementations, the image hiding neural network can intelligently decide which bits of the cover image to use for encoding such that the package image information is distributed throughout the cover image and such that it is difficult to determine that any information is hidden in the output carrier image.

At 412, the carrier image can be provided to one or more recipients. As one example, in some implementations, the carrier image can be provided through some electronic means such that an intended recipient can access the carrier image, for example, by posting on a web page or social media network.

Figure 5:
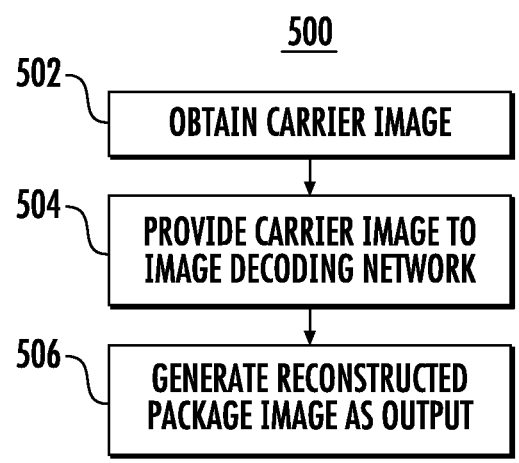
FIG. 5 depicts a flowchart diagram of an example method of recovering information according to example embodiments of the present disclosure.

FIG. 5 depicts a flowchart diagram of an example method of recovering information according to example embodiments of the present disclosure.

At 502, a computing device, such as second computing device 140 of FIG. 1, obtains a carrier image. For example, a user can access images via the second computing device 140, such as through a web page or media network.

At 504, the carrier image can be provided as input to an image decoding neural network, for example decoding network 150 of FIG. 1.

At 506, the image decoding neural network can decode the carrier image to determine the hidden information and generate as output a reconstructed package image that is close to the original package image.

Example Neural Network Ensembles and Output

Figure 6:
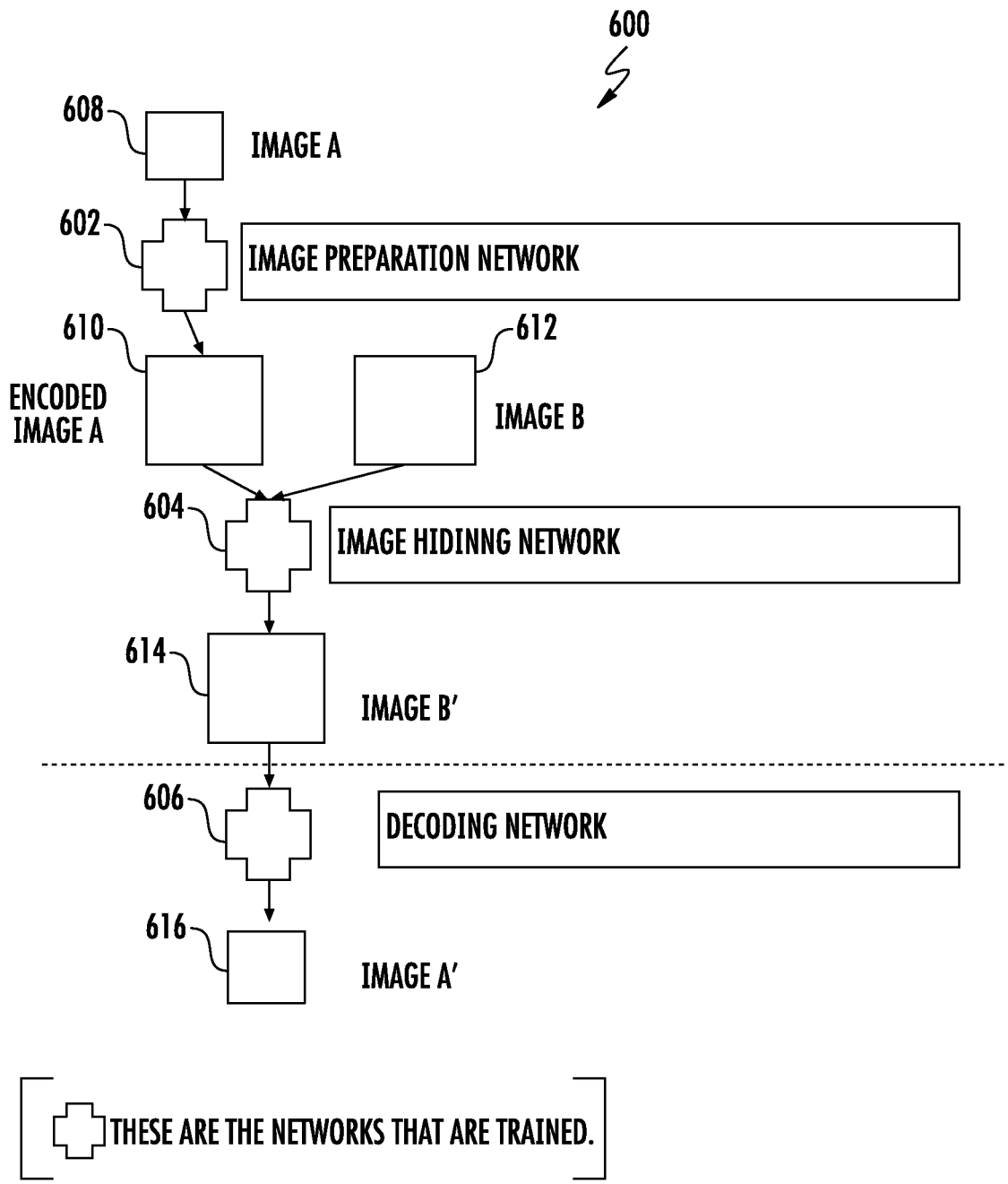
FIG. 6 depicts a block diagram of example neural networks for use in hiding information via deep learning according to example embodiments of the present disclosure.

FIG. 6 depicts a block diagram of an example neural network ensemble 600 for use in hiding and recovering information via deep learning according to example embodiments of the present disclosure. As illustrated in FIG. 6, in some implementations, a neural network ensemble 600 for use in hiding and recovering images can include an image preparation neural network 602, an image hiding neural network 604, and an image decoding neural network 606. As described herein, the image preparation neural network 602, image hiding neural network 604, and image decoding neural network 606 can be simultaneously trained as a large, deep neural network ensemble in such a way that the hidden information can only be recovered using a component of the deep neural network and where it is difficult to detect that information has been hidden.

According to one aspect of the present disclosure, in some implementations, neural network ensemble 600 can perform operations to hide a package image in a cover image generating a carrier image, and then recover a reconstruction of the package image from the carrier image. For example, a package image 608 can be provided as input to the image preparation neural network 602. The image preparation neural network 602 can generate and output a prepared package image 610.

The prepared package image 610 and a cover image 612 can be provided as input to the image hiding neural network 604. The image hiding neural network 604 can encode or otherwise hide the prepared package image 610 within the cover image 612 and generate as output a carrier image 614. The carrier image 614 closely resembles the cover image 612 but also contains the hidden prepared package image 610.

In some implementations, the carrier image 614 can be provided to one or more recipients who have been provided with the image decoding neural network 606 (e.g., having the neural network architecture and weights). The carrier image 614 can be provided as input to the image decoding neural network 606. The image decoding neural network 606 can recover the hidden information from within the carrier image 614 and generate as output a reconstruction of the package image 616.

Figure 7:
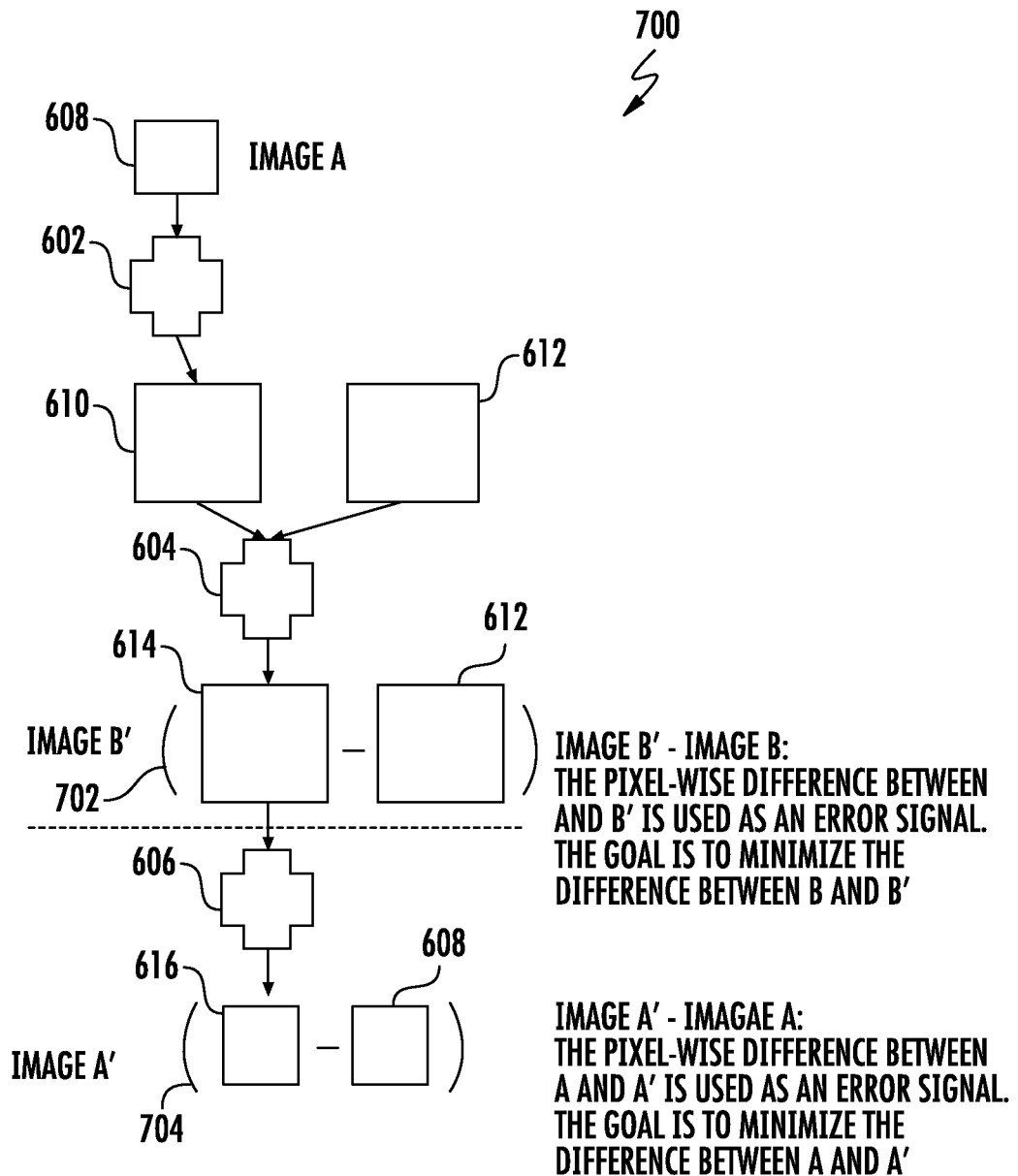
FIG. 7 depicts a block diagram of example neural networks for use in hiding information via deep learning according to example embodiments of the present disclosure.

FIG. 7 depicts a block diagram of example neural network ensemble training 700 for use in hiding and recovering information, such as images, according to example embodiments of the present disclosure. FIG. 7 further illustrates the training signals used in training a neural network ensemble, such as neural network ensemble 600 of FIG. 6. As discussed herein, a neural network ensemble including an image preparation neural network 602, image hiding neural network 604, and image decoding neural network 606 can be simultaneously trained as a large, deep neural network ensemble in such a way that the hidden information can only be recovered using a component of the deep neural network and where it is difficult to detect that information has been hidden. In particular, in some implementations, the neural networks of ensemble 700 can be simultaneously trained using two training or error signals where the two signals include a first error function 704 and a second error function 702. The first error function 704 can indicate the error from the image decoding neural network 606, being the difference (e.g., the pixel-wise difference) between the reconstruction of the package image 616 and the package image 608. The second error function 702 can indicate the error from the image hiding neural network 604, being the difference (e.g., the pixel-wise difference) between the carrier image 614 and the cover image 612.

According to an aspect of the present disclosure, the first error function 704 (the difference between the reconstruction of the package image 616 and the package image 608) can be provided to all three neural networks in ensemble 700 for training the neural networks and the second error function 702 (the difference between the carrier image 614 and the cover image 612) can be provided to the image hiding neural network 604 and the image preparation neural network 602 in ensemble 700 for training. For example, the image decoding neural network 606 can be provided with the first error function 704 during training, such as by back-propagating the first error function gradient through the image decoding neural network 606. The image hiding neural network 604 and the image preparation neural network 602 can be provided with both the first error function 704 and the second error function 702 during training, for example by back-propagating the combined gradients of the first error function and the second error function through each of the image hiding neural network 604 and the image preparation neural network 602.

Figure 8:
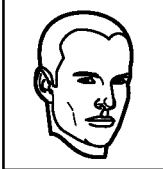
FIG. 8 depicts examples of input and output for neural networks used in hiding information according to example embodiments of the present disclosure.

FIG. 8 depicts some examples 800 of input and output of a neural network ensemble used in hiding and recovering images according to example embodiments of the present disclosure.

Additional Disclosure

The technology discussed herein may make reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to train neural networks for hiding image information, the method comprising:
   inputting, by one or more computing devices, a package image and a cover image into an image hiding neural network;
   generating, by the one or more computing devices, a carrier image as an output of the image hiding neural network, the carrier image comprising the package image hidden within the cover image;
   inputting, by the one or more computing devices, the carrier image into an image decoding neural network;
   generating, by the one or more computing devices, a reconstruction of the package image as an output of the image decoding neural network; and
   simultaneously training, by the one or more computing devices, the image decoding neural network based at least in part on a first loss function that describes a difference between the package image and the reconstruction of the package image and the image hiding neural network based at least in part on the first loss function a second loss function that describes a difference between the cover image and the carrier image.

2. The method of claim 1, wherein simultaneously training the image decoding neural network and the image hiding neural network comprises:

backpropagating, by the one or more computing devices, the first loss function through the image decoding neural network; and after backpropagating the first loss function through the image decoding neural network, continuing to backpropagate, by the one or more computing devices, the first loss function in combination with the second loss function through the image hiding neural network.

3. The method of claim 1, further comprising:

inputting, by the one or more computing devices, a raw package image into an image preparation neural network;

generating, by the one or more computing devices, a prepared package image as an output of the image preparation neural network; and simultaneously training, by the one or more computing devices, the image preparation neural network, based at least in part on the first loss function and the second loss function, in conjunction with the image decoding neural network and the image hiding neural network;

wherein inputting, by the one or more computing devices, the package image and the cover image into the image hiding neural network comprises inputting, by the one or more computing devices, the prepared package image and the cover image into the image hiding neural network;

wherein generating, by the one or more computing devices, the reconstruction of the package image as the output of the image decoding neural network comprises generating, by the one or more computing devices, the reconstruction of the raw package image as an output of the image decoding neural network; and wherein the first loss function describes a difference between the reconstruction of the raw package image and the raw package image.

4. The method of claim 3, wherein simultaneously training the image decoding neural network and the image hiding neural network comprises:

backpropagating, by the one or more computing devices, the first loss function through the image decoding neural network;

after backpropagating the first loss function through the image decoding neural network, continuing to backpropagate, by the one or more computing devices, the first loss function in combination with the second loss function through the image hiding neural network; and after backpropagating the first loss function in combination with the second loss function through the image hiding neural network, continuing to backpropagate, by the one or more computing devices, the first loss function in combination with the second loss function through the image preparation neural network.

5. The method of claim 1, wherein the package image is a same resolution as the cover image.

6. The method of claim 3, wherein the raw package image comprises a first image resolution and the cover image comprises a second image resolution that is different from the first image resolution; and wherein receiving, by the one or more computing devices, the prepared package image as the output of the image preparation neural network comprises receiving, by the one or more computing devices, the prepared package image that has the second image resolution as the output of the image preparation neural network.

7. The method of claim 1, further comprising inputting, by the one or more computing devices, a defined amount of noise into the carrier image output from the image hiding neural network during training.

8. The method of claim 7, wherein the noise inserted into the carrier image output during training causes the encoded information of the package image to be distributed throughout the cover image.

9. The method of claim 1, wherein the package image and the cover image are natural images.

10. The method of claim 1, wherein simultaneously training, by the one or more computing devices, the image decoding neural network and the image hiding neural network further comprises simultaneously training, by the one or more computing devices, the image decoding neural network and the image hiding neural network with a third error function that minimizes a pixel-wise correlation between a residual of the cover image and the package image.

11. A computing system comprising:

an image hiding neural network configured to receive a package image and a cover image and, in response, output a carrier image that comprises the package image hidden within the cover image;

one or more processors; and a first set of instructions that, when executed by the one or more processors, cause the computing system to:
input the package image and the cover image to the image hiding neural network; and
generate the carrier image that comprises the package image hidden within the cover image as an output of the image hiding neural network.

12. The computing system of claim 11 further comprising:

an image decoding neural network configured to receive the carrier image and, in response, output a reconstruction of the package image; and a second set of instructions that, when executed by the one or more processors, causes the computing system to:
input the carrier image to the image decoding neural network; and
generate the reconstruction of the package image as an output of the image decoding neural network.

13. The computing system of claim 11, wherein the computing system further comprises a hiding computing device, the hiding computing device comprising:

an image preparation neural network configured to receive a raw package image and, in response, output a prepared package image;

the image hiding neural network; and the first set of instructions;

wherein execution of the first set of instructions causes the hiding computing device to:
input the package image into the image preparation neural network; and
generate the prepared package image as an output of the image preparation neural network; and
wherein the instructions that cause the computing system to input the package image and the cover image into the image hiding neural network cause the hiding computing device to input the prepared package image and the cover image into the image hiding neural network.

14. The computing system of claim 12, wherein the computing system further comprises a decoding computing device, the decoding computing device comprising:

the image decoding neural network; and the second set of instructions.

15. The computing system of claim 13, wherein the package image comprises a first image resolution and the cover image comprises a second image resolution; and the image preparation neural network outputs the prepared package image with the same image resolution as the cover image.

16. The computing system of claim 11, wherein the encoded information of the package image is distributed throughout the cover image.

17. The computing system of claim 11, wherein the package image and the cover image are natural images.

18. The computing system of claim 12, wherein the image decoder and the second set of instructions are provided to an intended message recipient so that the intended recipient may recover the package image from the carrier image.

19. A computing system comprising:
an image decoding neural network configured to receive a carrier image and, in response, output a reconstruction of a package image that was hidden within the carrier image;
one or more processors; and
a first set of instructions that, when executed by the one or more processors, cause the computing system to:
input the carrier image to the image decoding neural network; and
generate the reconstruction of the package image that comprises a representation of a hidden package image as an output of the image decoding neural network.

20. One or more non-transitory computer-readable media that store instructions that, when executed by one or more processors of a computing system, cause the computing system to:
input a raw package image into an image preparation neural network;
generate a prepared package image as an output of the image preparation neural network;
input the prepared package image and a cover image into an image hiding neural network;
generate a carrier image as an output of the image hiding neural network, the carrier image comprising the prepared package image hidden within the cover image;
input the carrier image into an image decoding neural network;
generate a reconstruction of the prepared package image as an output of the image decoding neural network; and
simultaneously train the image decoding neural network based at least in part on a first loss function that describes a difference between the raw package image and the reconstruction of the raw package image, the image hiding neural network based at least in part on the first loss function and a second loss function that describes a difference between the cover image and the carrier image; and the image preparation neural network based at least in part on the first loss function and the second loss function.

21. The one or more non-transitory computer-readable media of claim 20, wherein simultaneously training the image decoding neural network, the image hiding neural network, and the image preparation neural network comprises:
backpropagating the first loss function through the image decoding neural network;
after backpropagating the first loss function through the image decoding neural network, continuing to backpropagate the first loss function in combination with the second loss function through the image hiding neural network; and
after backpropagating the first loss function in combination with the second loss function through the image hiding neural network, continuing to backpropagate the first loss function in combination with the second loss function through the image preparation neural network.

22. The one or more non-transitory computer-readable media of claim 20, wherein the package image and the cover image are natural images.

23. A computer-implemented method to train neural networks for hiding information, the method comprising:
inputting, by one or more computing devices, a package payload and a cover payload into an information hiding neural network;
generating, by the one or more computing devices, a carrier payload as an output of the information hiding neural network, the carrier payload comprising the package payload hidden within the cover payload;
inputting, by the one or more computing devices, the carrier payload into an information decoding neural network;
generating, by the one or more computing devices, a reconstruction of the package payload as an output of the information decoding neural network; and
simultaneously training, by the one or more computing devices, the information decoding neural network based at least in part on a first loss function that describes a difference between the package payload and the reconstruction of the package payload and the information hiding neural network based at least in part on the first loss function a second loss function that describes a difference between the cover payload and the carrier payload.

24. The method of claim 23, wherein simultaneously training the information decoding neural network and the information hiding neural network comprises:
backpropagating, by the one or more computing devices, the first loss function through the information decoding neural network; and
after backpropagating the first loss function through the information decoding neural network, continuing to backpropagate, by the one or more computing devices, the first loss function in combination with the second loss function through the information hiding neural network.

25. The method of claim 23, further comprising:
inputting, by the one or more computing devices, a raw package payload into an information preparation neural network;
generating, by the one or more computing devices, a prepared package payload as an output of the information preparation neural network; and
simultaneously training, by the one or more computing devices, the information preparation neural network, based at least in part on the first loss function and the second loss function, in conjunction with the information decoding neural network and the information hiding neural network;
wherein inputting, by the one or more computing devices, the package payload and the cover payload into the information hiding neural network comprises inputting, by the one or more computing devices, the prepared package payload and the cover payload into the information hiding neural network;

wherein generating, by the one or more computing devices, the reconstruction of the package payload as the output of the information decoding neural network comprises generating, by the one or more computing devices, the reconstruction of the raw package payload as an output of the information decoding neural network; and wherein the first loss function describes a difference between the reconstruction of the raw package payload and the raw package payload.

26. The method of claim 25, wherein simultaneously training the information decoding neural network and the information hiding neural network comprises:

backpropagating, by the one or more computing devices, the first loss function through the information decoding neural network;

after backpropagating the first loss function through the information decoding neural network, continuing to backpropagate, by the one or more computing devices, the first loss function in combination with the second loss function through the information hiding neural network; and after backpropagating the first loss function in combination with the second loss function through the information hiding neural network, continuing to backpropagate, by the one or more computing devices, the first loss function in combination with the second loss function through the information preparation neural network.

27. The method of claim 23, wherein the package payload, the cover payload, the carrier payload, and the reconstruction of the package payload comprise audio data.

28. The method of claim 23, wherein the package payload and the reconstruction of the package payload comprise one of image data, audio data, or textual data; and wherein the cover payload and the carrier payload comprise one of image data, audio data, or textual data.

* * * * *